US012447504B2

(12) United States Patent
Ensslin et al.

(10) Patent No.: US 12,447,504 B2
(45) Date of Patent: Oct. 21, 2025

(54) MACHINE FOR FRACTIONATING GROUND CEREAL PRODUCTS

(71) Applicant: SWISCA AG, Appenzell (CH)

(72) Inventors: Oliver Ensslin, Flawil (CH); Jonas Schär, Flawil (CH)

(73) Assignee: SWISCA AG, Appenzell (CH)

(*) Notice: Subject to any disclaimer, the term of this patent is extended or adjusted under 35 U.S.C. 154(b) by 0 days.

(21) Appl. No.: 18/851,752

(22) PCT Filed: Apr. 3, 2023

(86) PCT No.: PCT/EP2023/058615
§ 371 (c)(1),
(2) Date: Sep. 27, 2024

(87) PCT Pub. No.: WO2023/187216
PCT Pub. Date: Oct. 5, 2023

(65) Prior Publication Data
US 2025/0214112 A1    Jul. 3, 2025

(30) Foreign Application Priority Data

Apr. 1, 2022 (CH) .................................. 375/2022
Jul. 13, 2022 (CH) .................................. 837/2022

(51) Int. Cl.
B07B 1/38       (2006.01)
B07B 1/46       (2006.01)
B33Y 80/00      (2015.01)

(52) U.S. Cl.
CPC .............. B07B 1/38 (2013.01); B07B 1/4609 (2013.01); B33Y 80/00 (2014.12)

(58) Field of Classification Search
CPC ........... B07B 1/38; B07B 1/46; B07B 1/4609; B33Y 80/00
(Continued)

(56) References Cited

U.S. PATENT DOCUMENTS 2,166,367 A    7/1939   Norris
2,191,923 A *  2/1940   Cecka ....................... B07B 1/38
                                                        209/415

(Continued)

FOREIGN PATENT DOCUMENTS

DE    3041270 A1    9/1982
FR    985170 A      7/1951
(Continued)

OTHER PUBLICATIONS

International Search Report dated Jul. 20, 2023, Application No. PCT/EP2023/058615; 7 pages.

Primary Examiner — Terrell H Matthews
(74) Attorney, Agent, or Firm — Rankin, Hill & Clark LLP

(57) ABSTRACT

The plansifter or the grain purifying machine includes at least one sieve compartment with an arrangement of several sieve elements with sieves. The sieve compartments can be brought into oscillations in the form of circling movements. At least one of the sieves is designed as a flat body. The sieve holes are present as though-holes. The sieve can be present as a metal sieve with etched through-holes or the metal sieve can be manufactured by way of an additive method. The flat body sieve with through-holes significantly improves the efficiency of the fractionating process.

17 Claims, 4 Drawing Sheets

(58) Field of Classification Search
USPC .......................................................... 209/311
See application file for complete search history.

(56) References Cited

U.S. PATENT DOCUMENTS

| | | | |
|---|---|---|---|
| 3,155,460 A | | 11/1964 | Mears |
| 3,422,955 A | * | 1/1969 | Mock ........................ B07B 1/38 |
| | | | 209/415 |
| 2019/0374976 A1 | * | 12/2019 | Herrington ............. B07B 1/469 |

FOREIGN PATENT DOCUMENTS

| | | | | |
|---|---|---|---|---|
| JP | 3316032 B2 | * | 8/2002 | |
| WO | 2010/045284 A1 | | 4/2010 | |
| WO | WO-2014136121 A1 | * | 9/2014 | .......... G01M 5/0083 |
| WO | WO-2017019580 A1 | * | 2/2017 | ............. B01D 39/12 |
| WO | WO-2023187216 A1 | * | 10/2023 | ............... B07B 1/46 |

\* cited by examiner

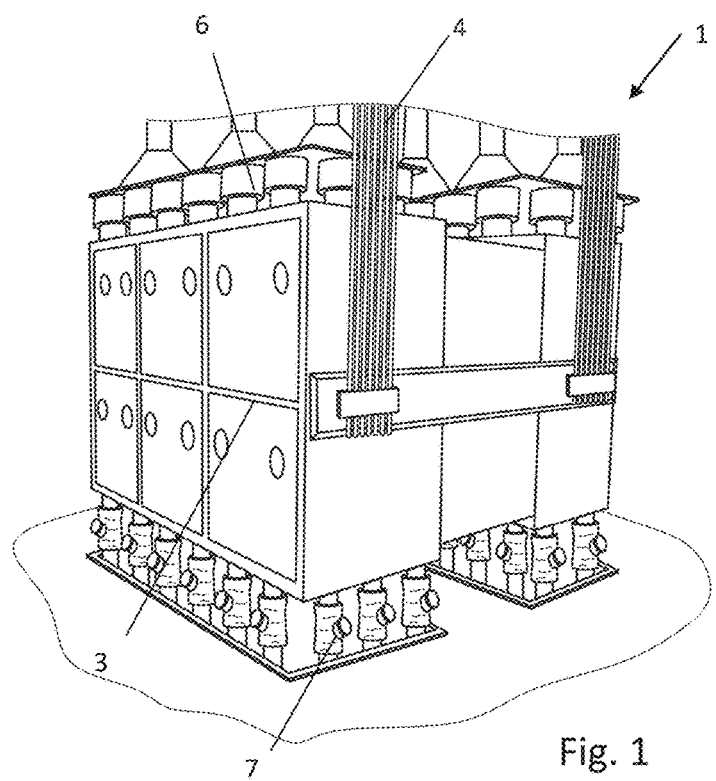
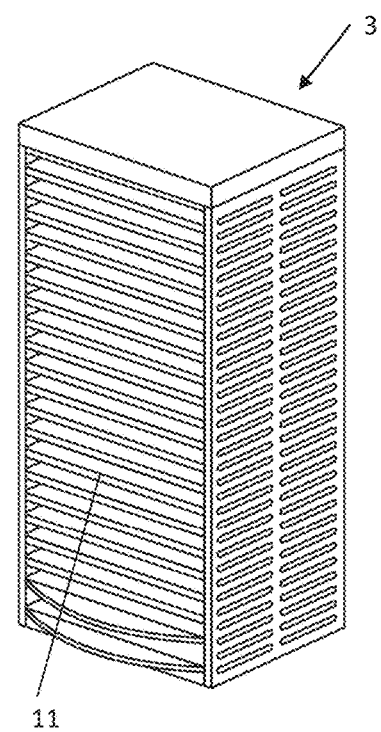
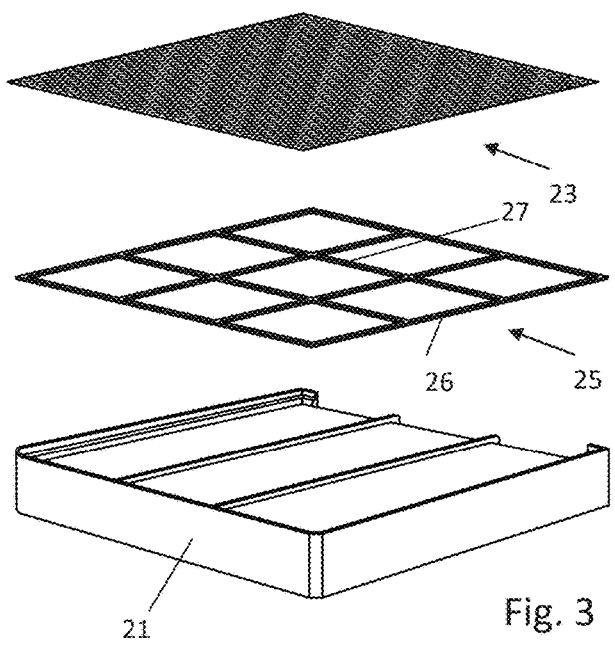
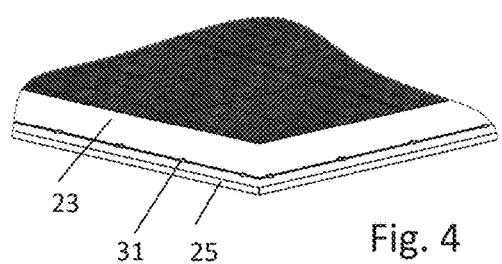
Fig. 1
Fig. 2
Fig. 3
Fig. 4

MACHINE FOR FRACTIONATING GROUND CEREAL PRODUCTS

BACKGROUND OF THE INVENTION

Field of the Invention

The invention relates to a machine for fractionating ground cereal products, for example a plansifter or a grain purifying machine.

Description of Related Art

Machines for fractionating ground cereal products serve for the separation of constituents of a ground product into coarser or finer grained constituents and under certain circumstances also into constituents of different densities, as well as for the removal of foreign bodies from the ground product. The separating of the ground product into differently grained constituents is also denoted as "grading" or "fractionating". In particular, plansifters and so-called grain purifying machines ('purifiers') are known amongst the machines for fractionating ground cereal products. Plansifters are generally used in the milling industry for fractionating ground cereal products between and after passages through the roller mill of a cereal mill. They can also be applied for so-called control sifting, i.e. sieving of flour which per se is ready for sale. Grain purifying machines serve for dividing the grain constituents in a procedure which is subsequent to the milling method or also between milling procedures.

The procedure of fractionating ground cereal products is not to be confused with the prior procedure of cleaning, to which the cereal grain is subjected in order to separate straw, stones, foreign bodies, seedlings or sand from the cereal and for which likewise—comparatively coarse—sieves are used.

Plansifters include sieve compartments which each include a stack of sieves which function as plane sieves. The sieves are each spanned on primary frames, so-called "looms" which for their part are inserted in sieve frames (denoted here as "secondary frames"). The sieve compartments are brought into horizontal oscillatory movements, in particular into circular oscillations in the sieve plane, by way of a suitable drive mechanism. Generally, so-called sieve purifiers, i.e. moving elements which are driven by the movements of the sieve compartments and by way of their movement relative to the respective sieve free this from blocked sieving product shares are also applied in plansifters.

Concerning grain purifying machines, the applied sieves are likewise arranged in several layers and are likewise brought into oscillation. However, in contrast to plane sieves as are used with plansifters, they do not (only) oscillate in the sieve plane, which is why they are classified as throw sieves. Furthermore, with regard to grain purifying machines, an air flow is generated, to which the sieving product is subjected during the sieving procedure.

Generally, sieves of various mesh sizes are applied within a machine for fractionating ground cereal products, so that a fractionating into more than two constituents is possible, said constituents being packaged accordingly for sale or being subjected to further processing steps, for example a fresh run through the roller mill.

Woven fabrics from a plastic yarn or plastic filament, for example of PET or polyamide, are known as sieves of such plansifters or of grain purifying machines. Woven fabrics of metallic wires are also obtainable, especially for the presieving with large mesh widths, since one often has to reckon with a high abrasion with this procedure. Since the sieves are designed as a woven fabric, the respective meshes are square. The mesh width is herein defined as the distance between adjacent filaments or wires.

For the fastening, a sieve is placed upon the loom of wood, plastic or metal which is envisaged for this, pretensioned and is glued on in the tensioned state, for example by way of cyanoacrylate. The use of such adhesives which could come into contact with the foodstuffs to be processed is increasingly being seen as being disadvantageous.

So-called "shale shakers", concerning which solid residues can be removed from drilled sludge as occurs with the extraction of shale oil, are known from the crude oil industry. WO 2017/019580 suggests the use of a metallic perforated plate as a sieve, wherein all common methods with which metallic perforated plates can be created are listed in the document, such being laser drilling, chemical etching, spark erosion, water-jet cutting, punching and further ones, wherein it is claimed that an extremely wide range of between 1 µm and 5000 µm can be considered for the size of the holes. Such a shale shaker is in no way suitable for the processing of ground cereal products.

DE3041270 and FR9851710 each teach a sieve for a hammer mill or generally for cereal products. The sieves are designed as metal sheets with elongate sieve slots. On account of the design of the sieve slots in their elongate shape, these sieves would not be suitable for machines in which a plurality of sieves form sieve compartments which are arranged for example above one another, wherein the sieve compartments are brought into oscillation. Generally, the sieve compartments in machines of the type which are described here are subjected to circling movements which is why generally sieve holes having essentially the same magnitude of length as the width should be used.

U.S. Pat. No. 2,166,367 relates to a method for manufacturing metallic screens, i.e. screen structures as are used with sieves, but also with printing methods. The method according to U.S. Pat. No. 2,166,367 is to create significantly more regular holes than the mere etching of holes into a metal sheet. The method consists of several steps and includes the galvanic precipitation of material on a specially manufactured matrix having prominences. The method is relatively complicated and cumbersome. For this reason alone, screen structures which are manufactured according to U.S. Pat. No. 2,166,367 would not be suitable as sieves for the industrial application in machines such as plansifters or grain purifying machines.

In contrast, to this day it is exclusively woven sieves which have proven their worth for applications in plansifters or grain purifying machines.

In the milling industry, there is the constant necessity to increase the efficiency of the fractionating process. The throughout per sieve area for a defined mesh size is dependent on the number of meshes per sieve area. This number can be optimised by way of further increasing the ratio between the open sieve area and the total sieve area, or defined more precisely, between an open sieve area and net sieve area (area of the sieve minus the loom and possible rods, i.e. the area, via which the sieve is freely suspended), by way of the use of thinner filaments or wires. However, limits are placed upon the optimisation is such a manner due the fact that the stability must be maintained, which indeed sets a minimal limit for the allowable filament or wire diameter for each applied material. Other optimisation possibilities, for example the use of optimised sieve cleaners only lead to further improvements in efficiency to a limited extent.

SUMMARY OF THE INVENTION

It is therefore the object of the present invention to provide a machine for fractionating ground cereal products, as well as a sieve element for such a machine, which overcome the disadvantages of the state of the art and which render the sieving process of a milled product which occurs in cereal mills more efficient. A further object of the invention is to further develop machines for fractionating ground cereal products such that they have additional functions and/or are suitable for new applications.

Machines of the type described here include at least one sieve compartment—often several sieve compartments, for example ones which are arranged next to one another—each with an arrangement of several sieve elements with sieves. Generally, the sieve compartments include stacks of the sieve elements. The machine is configured to bring the sieve elements into oscillations, for example in the form of circling oscillations which are activated by way of the rotation of an imbalance; and positively guided movements are also conceivable. In the context of the present text, when speaking of "oscillations", this also includes circular movements independently of the manner of their excitation. Generally, the sieve compartments are brought into oscillation as a whole, i.e. the stacks of sieve elements undergo common, in particular circling movements.

According to the invention, the sieve is designed as (at least one) flat body, for example of metal. Herein, the sieve holes are present as through-holes. Non-metallic materials are also conceivable, in particular materials with an adequate dimensional stability which are suitable for an etching method and/or an additive manufacturing method—for example ceramic materials which are suitable for example for the 3D screen printing method, or hard thermoplastic or curable (duroplastic) plastics.

A "flat body" is a foil or sheet, i.e. a coherent object which extends in two dimensions with an in particular constant thickness (extension in the third dimension) which is smaller by at least order of magnitude than the extensions in the two other dimensions (length and width). Depending on the thickness, such a flat body tends to be perceived more as a foil or as a sheet. In particular, a flat body can also be a sheet in the broad sense of the term; in specific embodiments the flat body in the present context is sheet also in a narrower definition of the term, which is to say a metal product which is manufactured by way of rolling.

Surprisingly, it has been found that the design as a flat body with through-holes—instead of as a woven fabric of filaments or wires as is the case in the state of the art—significantly increases the effectiveness. The time which is necessary in order to bring a certain quantity of sieving product (flour, dunst, semolina, grit etc.) through a defined sieve area with all other relevant parameters (mechanical excitation, size of the sieve holes, number of sieve holes) being equal, can be significantly reduced.

It can be particularly advantageous if a defined edge which is peripheral around the respective through-hole is formed between the upper-side and for example also the lower-side surface of the sieve on the one hand and the walls of the through-holes on the other hand, wherein the angle can be roughly 90°. Such a pronounced edge is present if the upper-side surface merges into the wall of the through-hole without a continuous curvature, which is to say if the average radius of curvature of a transition region which despite this can still be ascertained when considered microscopically, is very much smaller than half the thickness of the flat body, for example smaller than a fifth, an eighth or a tenth of the thickness of the flat body.

As is known per se from sieves according to the state of the art, the through-holes are different from slot-like holes by way of them being essentially equally wide as long in the plane of the sieve. In particular, they are round or have approximately the shape of a regular polygon. The average ratio between the longest extension of the through-holes in the sieve plane and the smallest extension in the sieve plane can accordingly be comparatively small, for example not more than 1.5, in particular not more than 1.3, 1.2 or 1.1. Through-holes with this characteristic are suitable for machines concerning which the sieve elements in the plane are subjected to uniform, for example circling movements. Furthermore, they permit a good discrimination of sieving product particles even if these are not spherical, which with ground cereal products is almost certainly the case.

In a first group of embodiments, starting from a metal sheet or a foil/plate of a different material, the sieve has been created by a material-removing method. In particular, the parallel methods, in which the material-removal procedure is carried out simultaneously for all through-holes—or for a large group of through-holes, for example complete coherent regions of the sieve—are suitable amongst the material-removing methods. Such a method is specifically etching. The sieve element can thus include an etched metal sieve.

Etching produces through-holes with walls which are roughly perpendicular to the sieve surface.

In a second group of embodiments, the sieve is manufactured by way of an additive method, thus a manufacturing method in which the material of the sieve is deposited layer for layer, in order to produce the sieve.

Also amongst the additive manufacturing methods, essentially parallel methods are particularly well suited. Regarding these essentially parallel methods, at least the procedure of the curing is effected in a layered manner over the complete surface of the sieve or over at least a part surface, in a parallel manner. This is in contrast to methods in which a laser beam locally cures in a selective manner and must therefore move over the complete sieve surface. Essentially parallel methods in particular can be methods from the category of the extrusion methods in the broadest sense, concerning which a 2D form is used, through which the material to be cured is printed.

Such an essentially parallel method is the 3D screen printing method. Concerning this, a suspension with particles of the material from which the object to be manufactured is to consist, thus here the sieve, is pressed in a layered manner by way of a squeegee through a screen which is provided with a stencil, the so-called screen printing screen (not to be confused with the screen (sieve) of the machine to be manufactured). The stencil here therefore serves as a printing form in the context of an extrusion method and defines (in two dimensions) the shape of the body to be manufactured. Each layer is cured before the next layer is deposited. After all layers have been deposited, a sintering can yet take placed for compacting. With regard to an application to the manufacture of the sieve, thus a screen printing screen with a stencil which represents a negative of the sieve to be manufactured is created and subsequently used for the additive manufacturing method.

The manufacture of a sieve with such an additive method also produces through-holes with walls which are roughly perpendicular to the sieve surface and with pronounced, well defined edges between the sieve surface and the walls.

Sieves of the type according to the invention—this applies to both groups of embodiments—therefore have webs between the sieve holes, the webs in cross section being rectangular (i.e. essentially rectangular as is yet described in more detail hereinafter), in contrast to the round cross sections of the filaments or wires of the woven sieves. Furthermore, the sieve forms a plane structure in contrast to woven sieves, concerning which the filaments or wires lie over one another at the crossing points.

The geometric differences can represent an approach with regard to explaining the greater efficiency of the procedure according to the invention in comparison to the state of the art. In particular, it could be that the edges which result at the upper side of the webs with a sieve to the invention have an important influence. On the one hand, they lead to a particle which is subjected to random movements hitting a surface on which it gets stuck, to a lesser probability and hitting an edge of the etched sieve to a greater probability. Secondly, they could lead to a lower probability of temporarily stable structures resulting from the sieving product, such structures extending beyond the sieve hole.

The findings of the present invention however do not depend on a certain explanation of the observed advantageous effect.

A further characteristic of etched sieves or ones which have been manufactured by way of an additive manufacturing method is also the fact that they are free of structures projecting beyond the plane of the sieve. This differentiates them from for example punched structures as is familiar with coarse perforated plates which each have a sharp burr on the one side, whilst conically tapering from the other side. It has been found that the absence of such structures positively influences the efficiency of the etched sieves.

A further advantage is the fact that the sieve as a flat body with through holes is simpler to clean, in particular by way of ultrasound, in comparison to the state of the art.

The through-holes can be arranged in a hexagonal structure, thus offset to one another from row to row. Herewith, a further advantage of the procedure according to the invention is utilised: the arrangement of sieve holes can be freely selected and one is no longer restricted to a rectangular arrangement. The hexagonal structure has the advantage that with a given minimal web width, one can arrange a high as possible number of sieve holes per sieve area. The gain in efficiency can be increased once again by way of this.

This similarly also applies to the shape of the sieve holes: the shape can also be freely determined within limits which are defined by the etching method or the additive manufacturing method. For this reason it is the case that not only the arrangement, but also the shape of the sieve holes can be approximately hexagonal. Herewith, for a given minimal web width, the ratio between an open sieve area and net sieve area can be maximised.

For example, one can envisage the through-holes of very fine sieves of the machine, for example down to a mesh width of approx. 0.3 mm, being approximately round, whereas larger through-holes are hexagonal.

The use of etched sieves or ones which are manufactured by an additive manufacturing method, i.e. of sieves with through-holes which are manufactured by way of etching, is particularly advantageous with mesh sizes of between 0.08 mm and approx. 1 mm. Accordingly, a machine according to the invention for example includes at least one sieve with through-holes of a mesh width between 0.08 mm and 1 mm.

In particular, it can have at least one sieve with a mesh width of more than 0.3 mm and with hexagonal through-holes.

In the case of non-square through-holes, in the present text the mesh width is defined as the square root of the area of the through holes in a horizontal section.

The width of the webs between the through-holes can correspond to just short of the thickness of the flat body. Concerning webs with a non-constant width, this applies to the width at the narrowest location. "Corresponding roughly to the flat body thickness" here means that the web width is not less than 40% or not less than 50% of the flat body thickness and not more than 160% or not more than 130% of the flat body thickness, and in particular can lie between 60% and 100% of the flat body thickness.

The manufacture of the sieve in the first group of embodiments as already mentioned is effected by way of etching (industrial etching processes are also denoted by the term "chemical milling", and in the present text, "etching" is generally to be understood as material-removing methods amid the use of substances which attack the material). Etching has the advantage that the process is parallel, in contrast for example to lasering, which particularly in the case of finely meshed sieves can be decisive for the efficiency of manufacture. The sieve holes (through-holes) in particular can be etched from both sides, i.e. from above and from below.

In embodiments of the first group, the sieves are designed such that the etching from above and below is asymmetrical, wherein more material has been removed from below and accordingly the narrowest location of the through-holes is located above a middle plane of the flat body. By way of this, the probability of a particle of the sieving product getting stuck in a through-hole is minimised.

In embodiments of the second group, with a sieve which has been manufactured in an additive manufacturing method, the layers from which the sieve is constructed in particular are parallel to the two large surfaces ("upper side and lower side") of the flat body. In embodiments of the second group, the sieve in particular is also metallic. In the embodiments of the second group there is not necessarily a defined narrowest location between the planes of the sieve which are defined by the large surfaces.

If the flat body from which the sieve is manufactured is metallic, there is also the option of it being manufactured from a magnetic (i.e. magnetisable, thus ferromagnetic or ferrimagnetic) material, for example of a magnetic steel. Ferromagnetic stainless steels (in particular martensitic or ferritic steels or steels with corresponding shares) are known as hard magnets as well as steels with soft-magnetic properties. The use of a magnetisable material has the following advantage: in the case of breakages of the sieve which can occur in the course of time, there is the possibility of removing a magnetic sieve fragment from the sieving product by way of subjecting the region with the fragment to a magnetic field.

The use of metals or certain plastics as a material of the flat body has a further possible advantage: the sieve can be fastened to a primary frame by way of welding. For this reason, the use of an adhesive becomes superfluous. A precondition for the weldability is the design of the sieve as a flat body with the through-holes. It is only due to this design that forces which act upon the webs between the through-holes can be dissipated over the complete periphery of the sieve sufficiently well and from there onto the primary frame. A welding of wires which form a woven wire sieve as is known from the state of the art, although being theoretically likewise possible, would be cumbersome and impractical.

Apart from a primary frame, to which the sieve is connected in a direct manner and which can therefore be construed as also being part of the sieve, the sieve element can include a secondary frame, onto which the primary frame is placed or which holds and/or receives the primary frame in another manner. The secondary frames of a sieve compartment can be stacked upon one another and/or they can be held by a sieve compartment housing and serve as modules of such a housing. A secondary frame which is additional to the primary frame however is not a necessity. It is also possible for the primary frames to be attached directly to the sieve compartment housing and/or to be stacked upon one another and to thus serve as a sieve frame. The sieve elements then consist merely of the primary frame with the sieves which are fastened thereto.

Apart from a machine for fractionating ground cereal products, for example a plansifter or grain purifying machine, a sieve for the use in such a machine as well as this use per se as well as a method for manufacturing a sieve for such a machine are also subject-matters of the present invention. In many embodiments, sieves for machines for fractionating ground cereal products have a comparatively large area of more than 100 cm$^2$, often at least 0.35 m$^2$.

A sieve according to the approach according to the invention can be of one piece, i.e. be manufactured of a single flat body. However, it is also possible for more than one flat body to be used, wherein for example two or more flat bodies as strips or pieces can be placed next to one another and fastened to the primary frame.

The primary frame, to which the sieve is directly fastened, apart from an outer frame part which frames the sieve area can also include rods over which the sieve spans. In this case, the sieve for example is not only fastened to the outer frame part, but also fastened to the rods.

Concerning sieves of the first group of embodiments, the manufacturing method includes the provision of the flat body and the production of through-holes in a material-removing method, for example etching, from both flat sides.

Concerning sieves of the second group of embodiments, these steps are replaced by the additive manufacturing method. This includes the provision of a suspension with in particular metallic (or consisting of another suitable, for example weldable material) particles which are suspended in a solvent and under certain circumstances with further constituents such as binding agents or other additives. In a further step, the method includes the depositing of the suspension in layers, wherein each layer has the shape which corresponds to the shape of the flat body with the through-holes (horizontal section) which is to be produced. This can be effected amid the use of a stencil (with 3D screen printing) or in the case of a non-parallel method also by way of selective curing by way of a laser beam. In the former case, in particular each layer after the deposition is at least partly cured before the next layer is deposited. This curing can also be effected as an actively induced step, for example irradiation with electromagnetic radiation (infrared or possibly visible and/or UV) or by way of the onflow with hot air with a hot air blower or and/or another manner of energy feed. Alternatively, in principle it is also conceivable for the step to be carried out passively by way of the material curing by itself, for which sufficient time is allowed.

Common to the methods according to the first group and methods according to the second group is the fact that a very plane surface with pronounced edges arise between the surface (i.e. the upper side and also the lower side) on the one hand and the walls of the through-holes on the other hand, and this being the case despite very small sizes of the through-holes which are due to the application. Concerning methods according to the first group, the pronounced edges result due to the characteristics of the applied material-removing etching process. Concerning methods of the second group, they result due to the fact that the layers which are successively deposited will always be comparatively thin in comparison to the thickness of the whole sieve and due to the fact that each layer can have precisely the same dimensions because of the particularities of the method.

This characteristic of the sharp edges differentiates the sieves which are manufactured by way of the described procedural manner, firstly from the woven sieves which are known from the state of the art. Secondly, they also differ from the sieves as are known from U.S. Pat. No. 2,166,367 concerning which the sieves are moulded with moulding technology and roundings results at edges due to the surface tension of the still flowable mass during the moulding process and also due to the mould-removal process—additionally to the roundings which the applied casting mould already has.

Furthermore—and this applies to both groups of embodiments—the method can include the fastening of the flat body to a primary frame, for example by way of welding, in particular laser welding or spot welding. A particular advantage of the procedure according to the invention is that herein the flat body does not need to be clamped in a particularly firm manner—it can be sufficient for it to be placed upon the primary frame in a correctly dimensioned manner and then fastened to this. By way of this, the disadvantageous gluing as well as the use of a clamping device can be avoided.

A sieve according to the second group of embodiments can optionally be configured to permit an automatic detection of breakages of the sieve. For this purpose, apart from electrically insulating material, the sieve includes a strip conductor which in particular is embedded in the electrically insulating material. The strip conductor forms an electrode at at least two locations—in particular at the two ends of the strip conductor. The machine is then configured, by way of a suitable sensor, to determine whether an electrical contact exists between the two electrodes. If this is not the case, the strip conductor is interrupted which is an indication of a breakage of the sieve. The machine can display the sieve breakage to the user and thus permit the sieve to be exchanged in good time without damage occurring due to the passage of non-sieved sieving product through the sieve surface or due to broken pieces of the sieve arising in the sieving product.

A further aspect of the present invention relates to the use of a sieve of the type which is described in this text and which is designed as a flat body with through-holes, as a sieve of a machine for fractionating ground cereal products—in particular a machine of the described type, in which the sieves form sieve compartments (open or closed) which are brought into oscillation movements.

Yet a further aspect of the invention relates to a new type of application of a machine for fractionating ground cereal products with sieves which are brought into movements, for example circling movements, in order to assist in the at least partial passage of sieving product to be fractionated, wherein at least one of the sieves is designed as a flat body with through-holes.

This new type of application is the fractionating of spent grain. "Spent grain" here denotes the by-product which on manufacture of beer or analogous methods remains as a residue after dissolving out the malt ingredients. Spent grain is a ground cereal product since the cereal—for example the barley—is crushed after the malting and the kilning and before the mashing, thus is subjected to a (comparatively coarse) milling process.

Apart from insoluble protein shares and further substances, spent grain usually—and generally indeed intended—contains the husks of the applied cereal. The spent grain is unsuitable for a subsequent fractionating on account of these husks due to the fact that the husks very quickly block the sieves of plansifters and similar machines. For this reason alone, spent grain is predominantly used as animal feed. On account of its richness in protein, spent grain however would also be suitable for the manufacture of nutritional foodstuffs for humans, for example for meat substitute products. An efficient approach for sieving husks and other coarse constituents from the spent grain would thus be desirable.

In tests, it has been found that in contrast to machines of the known type (plansifters or also throw sifters and other sifters with conventional woven sieves), concerning machines with sieves which according to the invention are designed as flat bodies with through-holes, specifically with pronounced edges between the surfaces and walls of the through-holes, no blockage was observed when spent grain is sieved. In contrast—and indeed surprisingly—it was found that machines of this type with flat sieves are suitable for fractionating spent grain without further ado. Herewith, a problem which the state of the art was not capable of solving was solved.

BRIEF DESCRIPTION OF THE DRAWINGS

Embodiment examples of the invention are hereinafter described by way of drawings. In the drawings, the same reference numerals denote equal or analogous elements. The drawings show elements which partly correspond to one another in sizes which differ from one another from figure to figure. There are shown:

FIG. 1 a view of a plansifter;
FIG. 2: a sieve stack;
FIG. 3 an exploded representation of a sieve element with sieve, primary frame and secondary frame;
FIG. 4 a primary frame with a sieve.

DETAILED DESCRIPTION OF THE INVENTION

Figure 5:
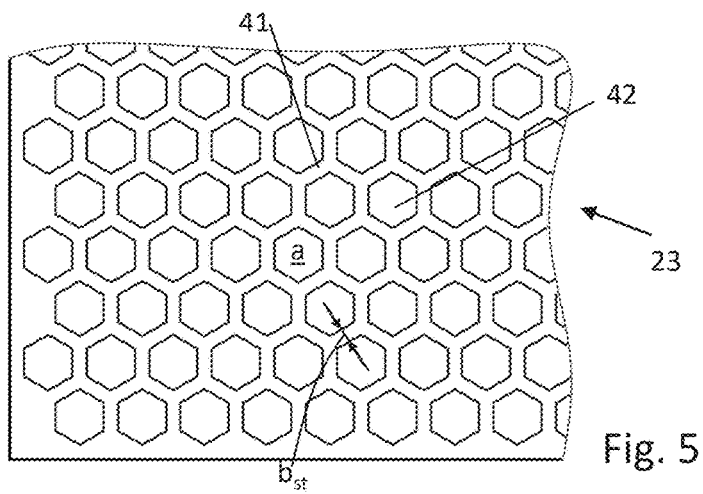
FIG. 5 schematically, a detail of a sieve with a hexagonal structure.

FIG. 1 as an example of a machine for fractionating ground cereal products shows a plansifter 1 as is applied in cereal mills. The plansifter includes a plurality of sieve compartments 3 which via a common suspension device 4 are assembled in a space such that common horizontal oscillating movements are possible. A drive (not visible in FIG. 1) is configured to bring the assembly of sieve compartments into for example horizontally circling oscillations. Moreover, the plansifter includes flexible feed conduits 6 as the sieving product inlet as well as likewise flexible outlet conduits 7 as the sieving product outlet.

Each sieve compartment 3 includes a stack of sieve elements 11 which are represented schematically in FIG. 2 and which are each with a sieve, wherein the sieves can have different mesh widths. Furthermore, a sieving product guide which for example is lateral with respect to the sieve is present, by way of which guide shares of the sieving product which are not sieved (which for example are led away laterally and for example to another sieve element which lies further below) and possibly also sieving product shares which are sieved are transported further, this being the case with each sieve. As a whole, the sieve compartments are designed such that a selection of the fed sieving product into sieved sieving product shares of a different grain size is effected, so that—depending on the fed sieving product—the sieving product shares which are fed into the different sieve product discharge conduits 7 have different characteristics.

This principle which is known per se, according to the present invention is implemented such that at least some of the applied sieves are present as for example metallic flat bodies with through-holes, for example as etched or additively manufactured sieves.

Concerning grain purifying machines, as with plansifters, likewise several sieve elements which can be arranged above one another are present. Concerning grain purifying machines, one generally does not speak of "sieve stacks"—the number of sieves which are arranged above one another is often smaller than with plansifters—but rather of sieve decks. In contrast to plansifters, the oscillation movement, to which the sieves are subjected, is different, which is why the sieves act as throw sieves. The subsequent explanations on the nature of the sieve elements and sieves generally relate to machines for fractionating ground cereal products, amongst such plansifters as well as grain purifying machines.

FIG. 3 schematically shows an exploded representation of a sieve element 11. A sieve frame 21 (secondary frame) acts as a supporting structure. It can moreover include a structure which is not represented in FIG. 3, for guiding so-called sieve cleaners which are likewise not represented in the drawings and which can be present as an option, in order to beat the sieve for example from below. The actual sieve 23 is fastened to a primary frame 25 which can be placed into the sieve frame 21 and be guided by this.

The primary frame 25 includes an outer frame part 26 which forms a rectangle, as well as rods 27, over which the sieve 23 is spanned. The frame elements of the outer frame part 26 as well as the rods 27, over which the sieve is spanned, can each have a rectangular or also other cross section.

The primary frame 25 with the sieve 23 which is fastened thereto is drawn in FIG. 4. It is an advantage of the invention that the fastening can be effected optionally by way of a weld connection, for example a spot weld connection. Corresponding weld spots 31 are schematically represented in FIG. 4.

In embodiments, the sieve is not only welded onto the outer frame part 26, but also onto rods 27, over which the sieve 23 is spanned, for example likewise by a spot weld connection or laser weld connection.

Metal sheets in their plane have a certain moderate elasticity. This characteristics is particularly advantageous in the context of the present invention: the sieve can be fastened to the loom 25 without having to use means for applying a tension force along the plane, such means being envisaged especially for this and being known for woven sieves. In contrast, the flat body with the through-holes merely needs to be placed onto the frame and then connected to this, for example by way of the mentioned spot weld connection or by way of laser welding. The use of an adhesive also becomes superfluous, which is to be seen as being advantageous for a component which comes into direct contact with foodstuff.

FIG. 5 schematically shows a detail of a sieve 23. The through-holes 42 are present in a hexagonal arrangement. Furthermore, the shape of the through-holes 42 is approximately hexagonal. Depending on the size of the through-holes 42, such a hexagonal shape inherently of the manufacture can be accomplished to a greater (given larger through-holes, i.e. when the sieve is comparatively large-meshed) or lesser extent, for example if the sieve is manufactured by way of etching. With very finely meshed sieves, an approximately round shape of the through-holes results depending on the manufacturing method. The advantages of the hexagonal arrangement however continue to exist independently of the real shape.

Figure 6:
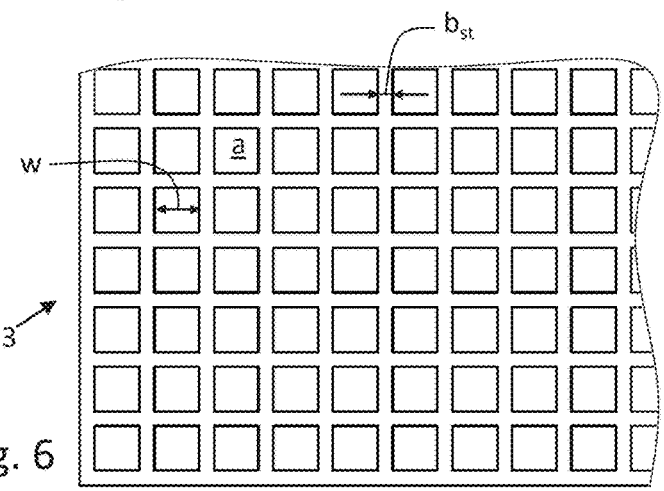
FIG. 6 likewise schematically, a detail of a sieve with a square grid arrangement.

Even if a hexagonal arrangement and shape are particularly advantageous, the sieve in principle can have arbitrary—generally regular—arrangements and arbitrary shapes of through-holes. FIG. 6 shows a square grid arrangement with square through-holes as automatically results in the case of woven sieves, and as can be present optionally with sieves of the type described here of a sheet metal or other flat bodies. FIG. 6 also shows the definition of the mesh width w which is defined as the width of the intermediate space between adjacent filaments (and not for instance for example the distance between the axes of the filaments); if the grid is non-plane, this definition applies to a projection onto the sieve surface.

Concerning a sieve with non-square through-holes such as that of FIG. 5, the mesh width can be defined as the square root of the area a of the through-holes in the horizontal section, i.e. the mesh width which would result if the through-holes have the area a, but were to be square.

Depending on the shape of the through-holes, one can also envisage the area being deliberately selected somewhat smaller—or possibly somewhat larger—than with square through-holes, in order to achieve the same grading. For example, given approximately round through-holes—such result for example on etching very small through-holes of for example less than 0.3 mm diameter; with additive methods too, a slightly rounded shape arises with very fine structures—one can select a diameter which results in an area of approx only 95% of the area a, which then results in roughly the same selection as with square through-holes of the mesh width $\sqrt{(a)}$. With hexagonal through-holes too—such can be produced with a somewhat larger mesh width of for example at least 0.3 mm with etched sieves—the through-hole can also have a little smaller area a than the corresponding square through-hole with the same grading effect.

The comparison between FIGS. 5 and 6 also illustrates than with a given web width $b_{st}$ and mesh width, the ratio between the open sieve area (the variable of importance for the throughput through the sleeve) and the net sieve area (which is generally given by the dimensions of the sieve element and cannot be influenced) is better given a hexagonal arrangement and given approximately hexagonal through-holes than given a conventional square arrangement. It has been found that for example in the case of hexagonal through-holes, the open sieve area when compared to steel woven fabrics can be enlarged by roughly 4% and compared to plastic woven fabrics (which necessitate somewhat thicker filaments) by about roughly 11%, which with industrial processes such as those which take place in cereal mills signifies a very significant increase in efficiency.

Additionally, in trials it has however been found that the sieve throughput through a sieve of the type according to the invention in comparison to the state of the art can be increased even further than that which could be explained by a larger open sieve area, which is yet explained hereinafter.

Figure 7:
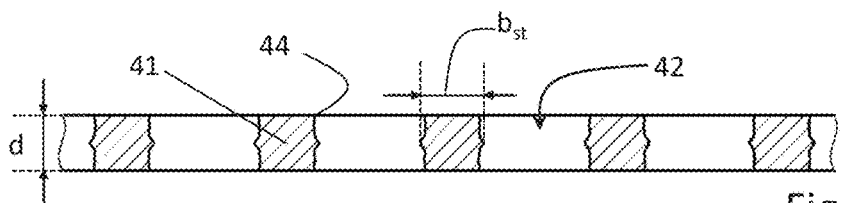
FIG. 7 a cross section through the sieve according to FIG. 5.

A vertical cross section through a sieve of the type according to the invention and which is manufactured by etching is shown in FIG. 7. FIG. 7 also illustrates the feature that the web width $b_{st}$ corresponds for example to roughly the thickness d of the flat body, i.e. the webs have an aspect ratio of roughly 1. In FIG. 7, one can also see that the webs 41 are rectangular in cross section, for example roughly square, wherein given a manufacture by way of etching, in particular one etches from both sides, thus from above and below, which is why a very slight narrowing of the through-hole results towards the middle plane, which however has no significant negative influence on the results which can be achieved.

Figure 8:
FIG. 8 a cross section through a sieve according to the state of the art.

A corresponding section through a woven sieve according to the state of the art is shown in FIG. 8.

A comparison between FIG. 7 and FIG. 8 shows that with sieves of the type according to the invention, edges 44 result along the webs, which is not the case with a woven sieve. The existence of such edges 44, in particular at the upper side, i.e. towards the product which is to be sieved represents one possible explanation for the efficiency with the approach according to the invention being so greatly increased. A flour or grit particle or a group of such particles would form part of a stable structure on the upper side of the sieve with a much lesser probability and at the edge would be deflected downwards in its movement with a much greater probability, than given a woven sieve with its round cross-sectional structures.

Figure 9:
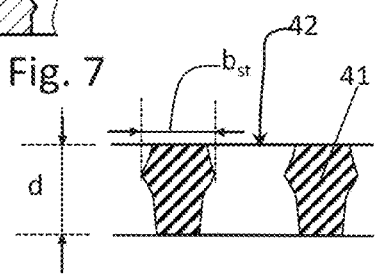
FIG. 9 schematically, an alternative cross-sectional shape.

FIG. 9 firstly schematically illustrates the principle of not having to etch equally deeply from both sides on manufacture by way of etching, but that asymmetrical configurations are also possible. In FIG. 9, one has etched roughly double as deeply from below as from above, so that accordingly the location with the greatest narrowing is above the middle plane. Such an asymmetrical configuration with the narrowest location above the middle plane can be advantageous, since on account of this the probability of the particles getting clogged in the through-hole is smaller. A potential further increase in the efficiency results from this.

Secondly, FIG. 9 illustrates that the web width $b_{st}$ can also be smaller than the thickness d, which has already been discussed above.

Thirdly, FIG. 9 also illustrates that even given the presence of—as mentioned, under certain circumstances advantageous—a sharp edge, the angle between the upper-side surface of the sieve and the wall of the through-hole does not need to be exactly 90° but can also be somewhat smaller.

Figure 10:
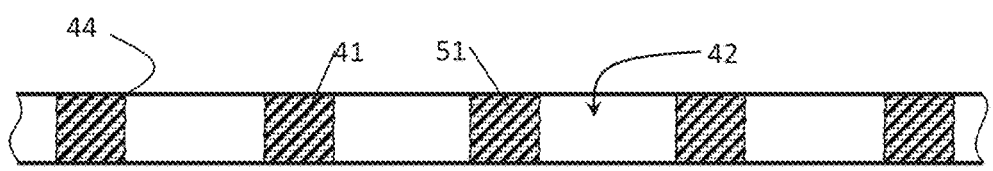
FIG. 10 a cross section through a sieve which was manufactured with an additive manufacturing method.

FIG. 10 shows a vertical cross section, analogously to FIG. 7, through a sieve of the type according to the invention, said sieve not having been manufactured by etching, but by way of an additive manufacturing method. By way of dotted lines, it is indicated that the sieve is constructed from a multitude of layers 51, wherein the layers run horizontally. The layered structure can, but does not necessarily have to, be recognisable on the sieve. The considerations explained by way of FIG. 7 relating to the dimensions and the shape (with edges 44), and by way of FIG. 9 relating to the web width also apply to embodiments of the second group, of which one example is represented in FIG. 10.

Example 1: Approx 100 g of commercially available wheat flour was given to a sieve which is manufactured by etching and is of the dimension 275 mm*175 mm (net sieve area) with a hexagonal arrangement of in total 427'000 through-holes. The through-holes had an area which was measured out by way of CAD software, of a=0.05309 mm$^2$, which corresponds to a mesh width of 0.23. The sieve was brought into horizontally circling movements (approx. 3 rotations per second; diameter of the movement circle: 5 cm). After in total approx. 25 s the flour has passed through the sieve with the exception of a small residual quantity.

An equal quantity of the same flour was given to a comparable commercially available nylon sieve (mesh width 0.236 mm; number of through-holes 426'000) and sieved through under the same conditions (same sieve dimensions and net sieve area). After 40 s, significant shares of flour has still not passed through the sieve, which is why additionally a sieve cleaner was placed upon the sieve to assist in the procedure. Only after a further 20 s—thus in total 60 s had the flour passed through with the exception of a small remainder of a comparable residual quantity.

In this example, therefore, the efficiency was increased by significantly more than a factor of 2.

This example indeed corresponds to a realistic application situation. It is common for ready-for-sale flour to be sieved once again in so-called control sifters before delivery, in order to filter out possible foreign bodies. A sieve such as the commercially available nylon sieve with a mesh width of 0.236 mm can be applied with such procedures.

Example 2: As Example 1 but with rye flour instead of wheat flour as the sieving product. Rye flour is highly agglomerating and therefore difficult to sieve. The increase in efficiency according to example 1 was confirmed.

Example 3: Analogously to Example 1, but a sieve which is manufactured by etching with a square arrangement of approximately square sieve holes was used (the shape of the sieve holes is that of squares with significantly rounded corners due to the etching process). The effective area of the through-holes was re-measured by CAD. It corresponded to the area of the square with a mesh width 236, i.e. 0.236 mm. On account of the circling movements practically the complete quantity of the 100 g of wheat flour has passed through the sieve already after 16 s. A renewed comparison measurement with the same quantity of white flour and with the nylon sieve of Example 1 and of a mesh width 0.236 mm, but without the use of a sieve cleaner has still not resulted in a complete passage of the wheat flour even after 93 seconds; i.e. the remaining residue was greater than with the sieve according to the invention after already 16 s.

Example 3 confirms that the arrangement and also the shape of the sieve holes tend to be secondary, and that the effect of the invention is due to the fact that the sieve intrinsically has a different structure than a woven sieve.

Figure 11:
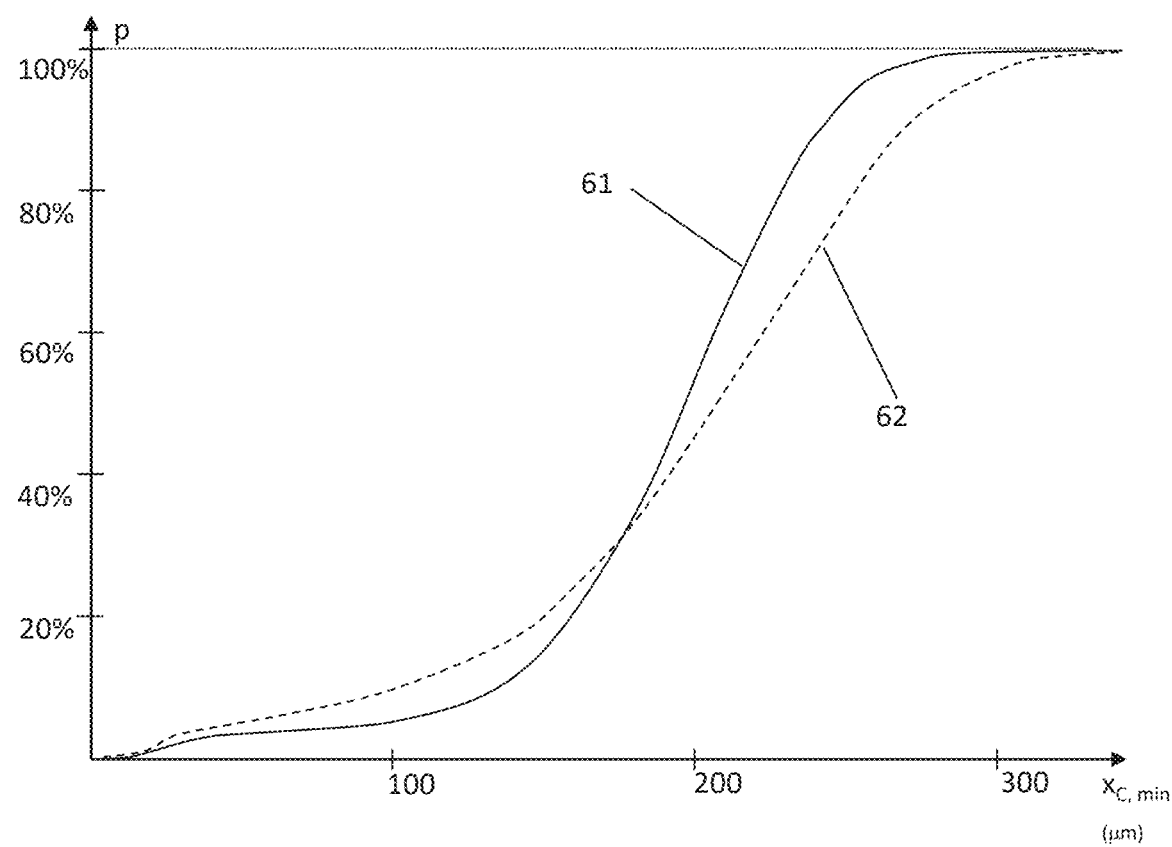
FIG. 11 a measurement of the grade efficiency curve for a sieve which is designed as a flat body with etched through-holes, in comparison to a sieve according to the state of the art.

FIG. 11 by way of a comparative measurement shows that the procedure according to the invention not only improves the efficiency of the sieving procedure, but also the fineness of the separation. The measurement was carried out with the sieve according to the invention and the commercially available nylon sieve according to Example 1.

This ground cereal product was sieved with the parameters according to Example 1. The so-called discharge, thus that share of the sieving product which is not sieved through was analysed with the help of a commercially available laboratory device (manufacturer: Microtrac) which utilises the principle of dynamic picture analysis (ISO 13322-2). Specifically, what was determined was the size distribution of the ground cereal product particles, and specifically with the minimal diameter $x_{C,\ min}$ as the characteristic quantity. $x_{C,min}$ is the minimal dimension of the respective particles— with spherical particles, $x_{C,min}$ corresponds to the diameter, with ellipsoidal particles double the value of the smallest semi-axis. FIG. 16 shows the so-called grade efficiency curve, i.e. that share of the number of ground cereal product particles with an $x_{C,min}$ value which is smaller than the value specified on the abscissa. One can see that with the first curve 61 which is obtained with the machine according to the invention with the etched sieve, the delimitation is significantly sharper (steeper gradient) than with the second curve 62 which results for the machine with a conventional sieve. From this, it is directly evident that the machine according to the invention and the sieve element according to the invention not only entails an improved efficiency but also an improved discrimination quality.

Figure 12:
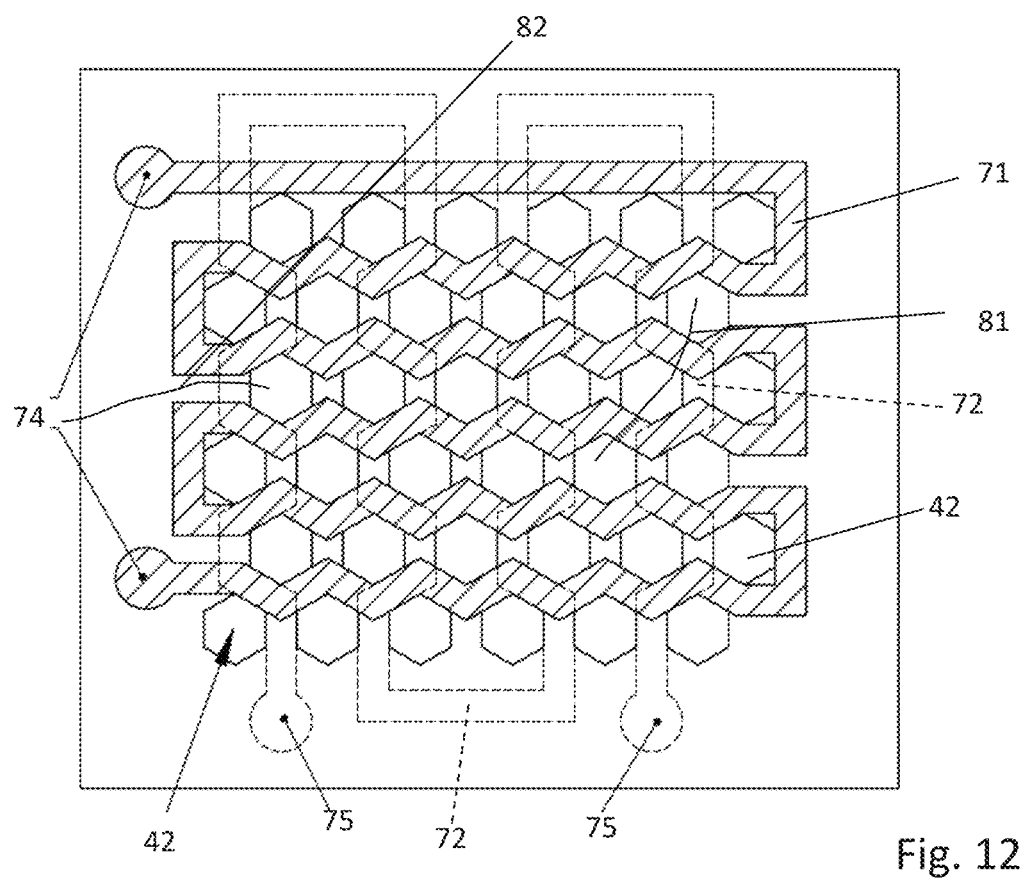
FIG. 12 a horizontal section through a sieve with an automatic sieve breakage recognition.
Figure 13:
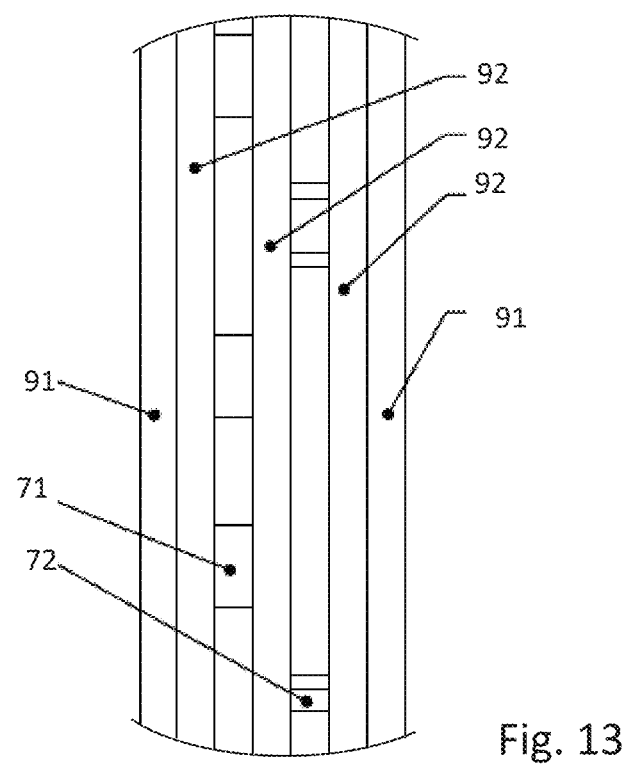
FIG. 13 a detail of a cross section through the sieve according to FIG. 12.

FIGS. 12 and 13 illustrate the possibility of providing a sieve element of the type according to the invention with an additional function, specifically an automatic sieve breakage recognition. This possibility specifically exists with sieve elements which are manufactured with additive manufacturing methods, in particular with the 3D printing method. The sieve element includes at least one embedded strip conductor 71 which runs between two contacts 74. In the shown embodiment example, the course of the strip conductor 71 is meandering. In the case of a sieve breakage 81, the strip conductor is interrupted and by way of this can be ascertained by a simple sensor or a simple measurement device, which examines whether an electrical connection exists between the two contacts 74.

The strip conductor 71 runs in an embedded manner, i.e. there is no contact to the upper or lower surface of the flat body. In embodiments in which these surfaces are metallic— i.e. the sieve element is essentially metallic—at least one electrically insulating layer 92 will be present between the strip conductor 71 and the metallic layers 81 on the surfaces; likewise, the layer with the strip conductor 71 can be filled out with electrically insulating material (i.e. be electrically insulating at those positions in the sieve element plane where there is no strip conductor). Suitable electrically insulating materials are the mentioned ceramic materials or hard thermoplastic or curable plastics.

In the represented embodiment example, apart from the (first) strip conductor 71, a second strip conductor 72 is present in another layer and likewise runs in a meandering manner but with a different, in particular orthogonal primary direction. Sieve breakages such as the second represented sieve breakage 82 which run such that they do not sever the first strip conductor 71 can thus be ascertained. The second electrodes 75 for the second strip conductor are read out separately by the (first) electrodes 74 of the first strip conductor 71.

The invention claimed is:

1. A machine for fractionating ground cereal products, comprising at least one sieve compartment with a plurality of sieves, a sieving product inlet and a sieving product outlet, wherein the machine is configured to bring the sieve into oscillation movements, in order to assist in the at least partial passage of the sieving product through the sieve, said sieving product being in through the sieve inlet, wherein at least one of the sieves is designed as a flat body with through-holes, wherein for webs which are formed between adjacent through-holes, it is the case that: 0.5*d<bst<1.6*d, wherein d is the thickness of the flat body and bst is the width of the webs at their narrowest location.

2. The machine according to claim 1, wherein the flat body is metallic.

3. The machine according to claim 2, wherein the metallic flat body is magnetic.

4. The machine according to claim 1, wherein the sieve is fastened to a primary frame.

5. The machine according to claim 4, wherein the primary frame comprises an outer frame part which runs along a periphery of the sieve, as well as rods over which the sieve is spanned, and wherein the sieve is fastened to the outer frame part as well as to the rods.

6. The machine according to claim 4, wherein the sieve is welded to the primary frame.

7. The machine according to claim 1, wherein the through-holes of at least one of the sieves form a hexagonal arrangement.

8. The machine according to claim 1, wherein the through-holes of at least one of the sieves have a hexagonal shape.

9. The machine according to claim 1, wherein the flat body forms an edge around the through-holes.

10. The machine according to claim 1, which is free of adhesive in contact with the sieve.

11. The machine according to claim 1, wherein the through-holes are created by way of etching.

12. The machine according to claim 1, wherein the sieve is manufactured by way of an additive manufacturing method.

13. The machine according to claim 1, which is configured to bring the sieves into oscillations in a horizontal sieve plane, whereby the machine is a plansifter.

14. The machine according to claim 1, which is configured to bring the sieves into oscillations such that a sieve plane is subjected to oscillations, whereby the sieves act as throw sieves.

15. The machine according to claim 1, wherein at least one of the sieves is equipped for an automatic detection of sieve breakages by comprising a strip conductor which is formed in electrically insulating material, wherein the strip conductor forms an electrode each at two locations, whereby one can ascertain whether the strip conductor between the electrodes runs in an uninterrupted or interrupted manner.

16. A sieve element for fractionating ground cereal products, the machine comprising at least one sieve compartment with a plurality of sieves, a sieving product inlet and a sieving product outlet, wherein the machine is configured to bring the sieve into oscillation movements, in order to assist in the at least partial passage of the sieving product through the sieve, said sieving product being in through the sieve inlet, the sieve element comprising a flat body with an area of at least 100 cm$^2$ with a regular arrangement of through-holes, as well as a primary frame, to which the flat body is fastened, wherein for webs which are formed between adjacent through-holes, it is the case that: 0.5*d<bst<1.6*d, wherein d is the thickness of the flat body and bst is the width of the webs at their narrowest location.

17. A machine for fractionating ground cereal products, comprising at least one sieve compartment with a plurality of sieves, a sieving product inlet and a sieving product outlet, wherein the machine is configured to bring the sieve into oscillation movements, in order to assist in the at least partial passage of the sieving product through the sieve, said sieving product being in through the sieve inlet, wherein at least one of the sieves is designed as a flat body with through-holes, wherein at least one of the sieves is equipped for an automatic detection of sieve breakages by comprising a strip conductor which is formed in electrically insulating material, wherein the strip conductor forms an electrode each at two locations, whereby one can ascertain whether the strip conductor between the electrodes runs in an uninterrupted or interrupted manner.

* * * * *